United States Patent [19]

Barberi

[11] 4,146,977
[45] Apr. 3, 1979

[54] EDUCATIONAL TOY

[76] Inventor: Maryhannah S. Barberi, 42 Thornton St., Hamden, Conn. 06517

[21] Appl. No.: 867,472

[22] Filed: Jan. 6, 1978

[51] Int. Cl.² ............................................. G09B 1/20
[52] U.S. Cl. ..................................... 35/77; 35/31 A; 35/DIG. 2
[58] Field of Search ............... 35/18 A, 27, 28, 31 A, 35/31 D, 31 F, 35 G, 35 H, 76, 77

[56] References Cited

U.S. PATENT DOCUMENTS

| 242,821 | 6/1881 | Farmer | 35/18 A |
| 1,595,115 | 8/1926 | Myers | 35/76 UX |
| 3,357,116 | 12/1967 | Bazacos | 35/31 F |
| 3,721,020 | 3/1973 | Martin | 35/35 H |
| 3,813,471 | 5/1974 | Dean | 35/35 H |

FOREIGN PATENT DOCUMENTS 21623 11/1893 United Kingdom ........................ 35/77

Primary Examiner—Harland S. Skogquist
Attorney, Agent, or Firm—Lawrence Hager

[57] ABSTRACT

An educational toy which utilizes visual and tactile association to develop, particularly in the young child and the child with learning disabilities, the ability to recognize/identify a picture and/or figure of an object with, for example, a descriptive word or symbol having associative significance.

Two columns of drums, each independently operable, are rotatably mounted in a housing having viewing windows adjacent each drum. Each drum in one column has a plurality of pictorial representations on its circumferencial surface which has associative significance with a descriptive word or symbol on the circumferencial surface of an adjacent drum. Learning, for example, visual discrimination, is effected by alignment of pictorial representations with associated words/symbols. The learning experience is enhanced and reinforced by color alignment and tactile association respectively.

10 Claims, 8 Drawing Figures

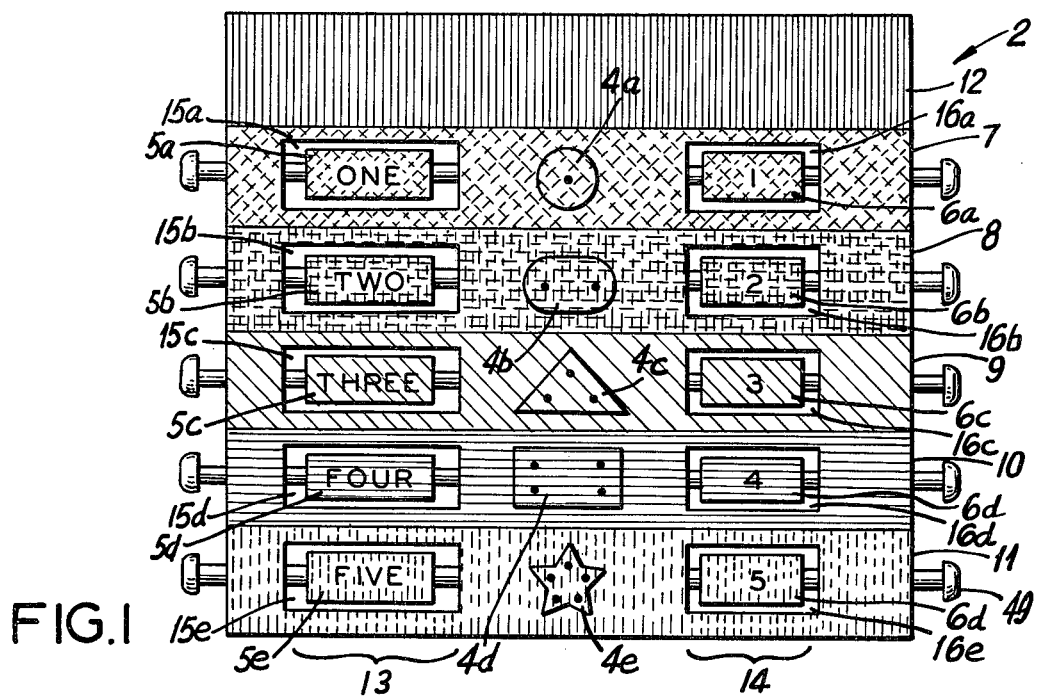

EDUCATIONAL TOY

FIELD OF THE INVENTION

This invention relates to educational aid devices and particularly to a device that can be utilized as a toy and/or an educational device which enables self-taught association between an object and, for example, its identifying name or symbol.

BACKGROUND OF THE INVENTION

A number of educational devices, particularly for children, have been proposed such as is described in U.S. Pat. No. 1,619,160 issued Mar. 1, 1927 to Herbert H. Steele, U.S. Pat. No. 3,303,580 issued Feb. 14, 1967 to Virginia L. Stinar, U.S. Pat. No. 3,455,035 issued July 15, 1969 to Jack L. Breneman and U.S. Pat. No. 4,045,884 issued Sept. 6, 1977 to Frances Lee Zand.

Typically, these devices require complicated mechanical and electrical mechanisms for actuating its informational display. The complexity and cost of such devices generally necessitate limiting or dedicating use of the device to that of an educational aid.

Another problem which may be encountered by use of these prior art devices is that of child rejection due to association of the device only as an educational (work) device.

Typically, the prior art devices also require instructional guidance, correction, supervision and (frustrating) trial-and-error actuation to utilize the device.

In contrast to the prior art, the present invention provides a device having a simple, robust and relatively inexpensive structure which combines the capabilities and advantages of both a toy and an educational device, enables manipulation and varied arrangement of its constituent parts, is adapted for ease of use, provides feedback to enhance self-taught learning and involves a minimum of associated parts.

SUMMARY OF THE INVENTION

Generally speaking, in accordance with the invention, an educational and/or toy device is provided having at least two columns of independently operable drums, each rotatably mounted in a housing. Each drum in a column is disposed adjacent a drum in another column to form rows of drums. Each drum has at least one pictorial representation and/or intelligence on its circumferencial surface which is associated or integrated with a coding scheme, for example, a color pattern, on said drum. By aligning the correspondingly coded areas/items on the adjacent drums, association between pictorial representations, objects, words, intelligence or symbols having interrelationship can, thereby, be recognized and developed.

Accordingly, it is an object of this invention to provide a new and improved educational and/or toy device.

Another object of this invention is to provide an apparatus to enhance learning by identifying items having associative meaning.

A further object of this invention is to provide an educational/toy device which develops an awareness or sense of perspective, for example, for associating and/or grouping items, symbols etc. of like kind and for appreciating/recognizing the interrelationship between the items, indicia, symbols and figures.

A further object of this invention is to provide an educational/toy device which develops and improves the sequential and progressional thinking/memory ability of a person.

A further object of this invention is to provide an educational toy which enables manipulation and/or varied arrangement of its constituent parts, e.g., its drums, to thereby stimulate interest, exploration and logical thinking.

A further object of this invention is to provide an educational device which enables self-taught recognition of items having associative significance.

A further object of this invention is to provide an educational device which developes recognition of intelligence, words and pictorial representations having associative significance.

A further object of this invention is to provide an educational device which enables self-correction by means of a coding system.

A further object of this invention is to provide an educational device which utilizes visual and tactile association between items having associative significance.

A further object of this invention is to provide an educational device which developes the concept of sequencing and/or placement of items in a predetermined order or arrangement.

A further object of this invention is to provide a new and improved toy.

A further object of this invention is to provide a manipulative type toy or game.

A further object of this invention is to provide a toy or game which involves the systematic arrangement of colors and/or indicia.

BRIEF DESCRIPTION OF THE DRAWINGS

Other objects and advantages of this invention may be seen more clearly from the following description when viewed in conjunction with the accompanying drawings. Like numerals refer to like parts throughout.

FIG. 1 is a top plan view of the preferred embodiment of the educational/toy device according to the present invention;

FIG. 2 is a side-view of the preferred embodiment of the housing assembly of the educational/toy device according to the present invention;

FIG. 3 is an enlarged detail sectional view of an embodiment of a fastener for detachably mounting the tactile figures onto the top cover member of the educational/toy device;

FIG. 4 is a perspective view of an alternative construction of the drums;

FIG. 5 is an edge view of the drum band shown in FIG. 4;

FIG. 6a is a plan view of the circumferencial surfaces of the drum band and drums 6a through 6e in open condition;

FIG. 6b is a plan view of the circumferencial surfaces of the drums 5a through 5e in open condition.

Figure 7:
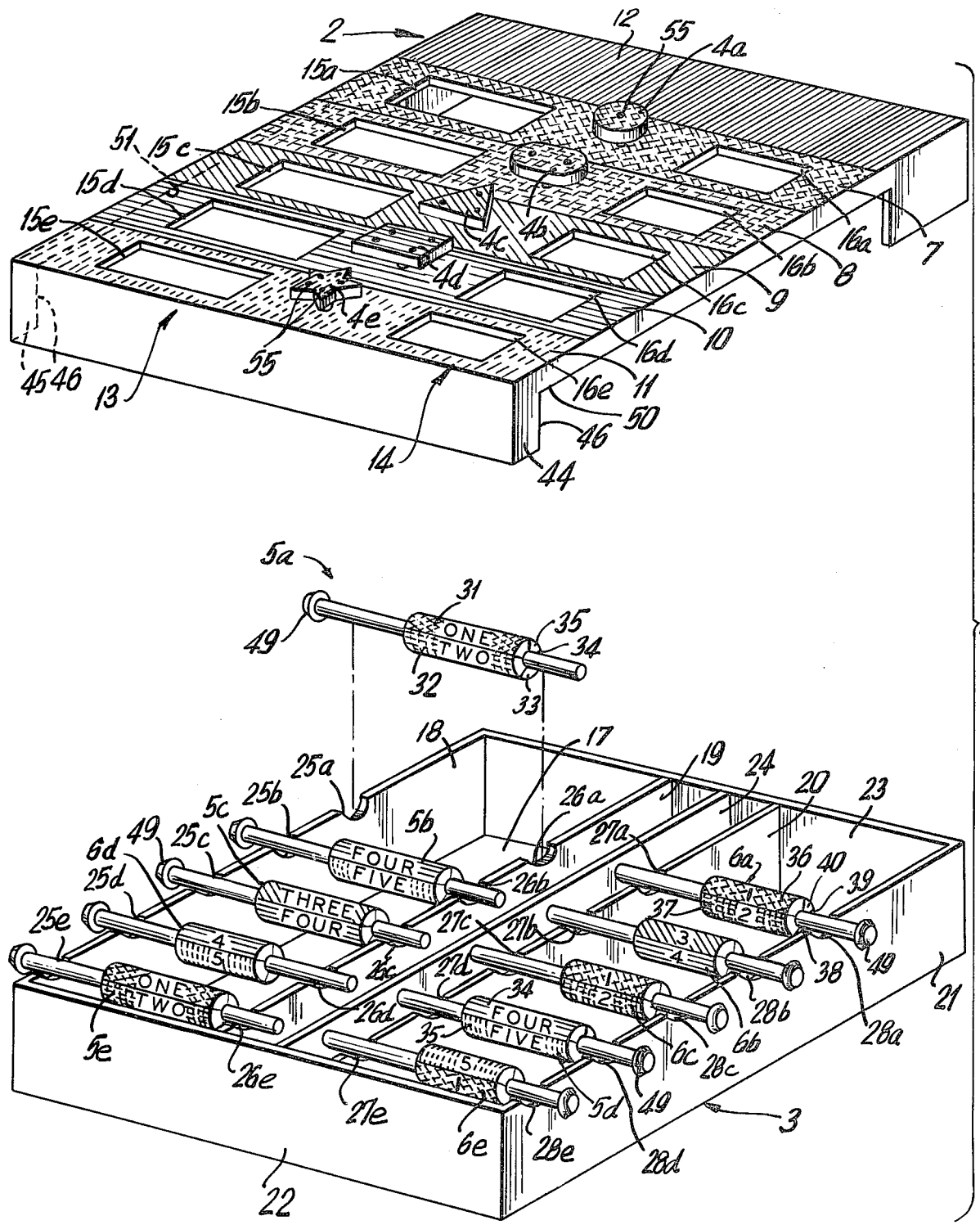
FIG. 7 is a partially exploded perspective view of the preferred embodiment of the present invention.

Referring to the drawings, particularly FIGS. 1 and 7, the invention comprises a housing assembly 1 which includes a top cover 2 and a base member 3, tactile figures or structures 4a through 4e and a plurality of drums 5a through 5e, 6a through 6e. The constituent parts of the educational/toy device may be formed of metal, glass, wood, plastic, polystyrene or from various resins including acrylic or vinyl resins.

The top cover 2 of the housing assembly 1 is divided into five horizontally functional rows 7 through 11, each visually distinguishable, for example, by a color of the rainbow. The upper edge of the top cover 2 is made visually distinguishable from the other rows by forming a separate and differently colored horizontal row 12. The rows 7 through 11 and 12 are each colored in the preferred (color of the rainbow) order orange, yellow, green, blue, purple and red respectively.

The top cover 2 is provided with two columns 13, 14 of vertically aligned spaced viewing windows 15a through 15e and 16a through 16e respectively. Each of the rows 7 through 11 have two longitudinally aligned viewing windows provided therein. For example, row 7 contains viewing windows 15a and 16a.

The viewing windows forming column 13 are rectangularly configured and positionally aligned to enable viewing, for example, of the words one, two ... five provided on the circumferencial surfaces of each drum 5a through 5e. Column 14 comprises five rectangular viewing windows also positionally aligned and of slightly different shape or size, for example, smaller, than the viewing windows forming column 13 so as to be readily distinguishable therefrom and to enable viewing therethrough of the corresponding symbols/indicia, for example, 1, 2 ... 5 provided on the circumferencial surfaces of each of the drums 6a through 6e.

The box-like base member 3 comprises a bottom wall 17, four drum mounting walls 18, 19, 20, 21, a front wall 22, a back wall 23 and a divider wall 24. The drum mounting walls 18, 19, 20, 21 each have five spaced bifucated or semicircular cut-outs 25a through 25e, 26a through 26e, 27a through 27e and 28a through 28e respectively. Each cut-out in a mounting wall is substantially aligned with a cut-out in each of the other mounting walls. For example, cut-out 25a is aligned with cut-outs 26a, 27a and 28a to form horizontally aligned support mountings for the axially aligned shafts of the drums 5a and 6a. The divider wall 24 is provided between the inner mounting walls 19, 20 and functions as an abutment wall for the drums. The divider wall 24 may also serve as a means of aligning the drums vertically. The drums are rotatably and removably mounted within the cut-outs and between the two pairs of drum mounting walls 18 and 19, 20 and 21. The divider wall 24 is positioned between the inner drum mounting walls 19, 20 such that when the drums are mounted as illustrated in FIG. 7, but in the preferred arrangement as illustrated in FIG. 1, i.e., drums 5a through 5e being vertically aligned with column 13 and drums 6a through 6e being vertically aligned with column 14, the differently sized drums 5a through 5e and 6a through 6e align with the corresponding viewing windows 15a through 15e and 16a through 16e respectively for mating therewith to enable viewing of the drums through the viewing windows as shown in FIG. 1. Thus, the constituent parts of the device, in accordance with the invention, are configured to encourage, suggest, imply or coerce assembly/arrangement of the drums as shown in FIG. 1 so as to obtain vertical (group) alignment of the word-drums and numbered-drums in the preferred columns. In this manner, the child is encouraged and/or taught to associate/group items which are of similar nature, e.g., which have word markings and/or have similar physical characteristics such as size.

It should be recognized, however, that each drum may be mounted between either pair, i.e. 18-19 and 20-21, of the drum mounting walls as illustrated in FIG. 7 by drums 5d and 6d. This feature may be provided to enable the child to experiment and play with the arrangement of the drums.

The circumferential surface of each drum is divided into five sectors or areas 31 through 35, or 36 through 40. The number of sectors correspond to the number of horizontally functional rows 7 through 11. Each sector 31 through 35, 36 through 40 has an indicia provided thereon. For example, each of the drums 5a through 5e have the words one, two ... five provided on the sector 31 through 35 respectively. And each drum 6a through 6e has the corresponding numbers 1, 2 ... 5 provided on its sectors 36 through 40 respectively. FIGS. 6a and 6b show a plan view of the circumferencial surfaces of the drums 6a through 6e and 5a through 5e in open condition. Each sector which has a corresponding indicia provided thereon is color (coded) by a similar color. Alignment of similarly color (coded) sectors results in alignment of the corresponding indicia or intelligence. For example, sectors 31 through 35 and 36 through 40 are both color (coded) orange, yellow, green, blue and purple and also provided with the indicia one, two ... five and 1, 2 ... 5 respectively.

A tactile figure or object 4a through 4e is disposed between two viewing windows in each of the rows. Each tactile figure is configured to correspond to one of the five indicia provided on the surface of each drum. For example, the five pointed star corresponds to the indicia five and 5. The tactile figures are each color (coded) to correspond to one of the horizontal rows and a sector of each drum. In addition, each tactile figure may be provided with a marking or symbol which also corresponds to the same indicia that the tactile figure so marked corresponds to. For example, a plurality of dot markings 55 on the tactile figures may be used to correspond to the corresponding indicia. The tactile figures are removably mounted or affixed to the top cover 2 by any conventional fastener means 41 such as is sold under the trademarks "LEGO" and "VELCRO" or by a snap fastener means.

Since fasteners are well known such as is described in U.S. Pat. No. 2,397,801 issued Apr. 2, 1946 to Alexander R. Mitchell, and U.S. Pat. No. 3,210,820 issued Oct. 12, 1965 to J. H. Humiston, they, therefore, will not be described in detail herein to avoid prolixity. Briefly, however, and with reference to FIG. 3, one embodiment of the mounting means 41 may comprise a snap fastener of the type having complementary male or stud 42 and female or socket 43 members. The socket member 43 comprises an elastic plastic material which affords sufficient rigidity to enable the slightly enlarged head of the stud 42 to be releasably inserted into and readily detached from the socket 43 provided in the plastic tactile figures. In this manner, the tactile figures can be affixed to the top cover 2 in releasable engagement therewith to permit varied placement of each tactile figure for alignment with a selected row/indicia.

Referring to FIGS. 2 and 7, the side walls 44, 45 of the top cover 2 are contoured by cut-outs 46, 47 which enable the top cover 2 to be fitted over the bottom member 3 while the shafts 48 (shown in phantom outline in FIG. 2) and turning knobs 49 extend or protrude outwardly from the side openings of the device to thereby permit manual rotation/actuation of the drums. The cut-outs 46, 47 have a drum retaining ledge 50, 51 which, with the top cover 2 fitted over the bottom member 3, rests on the shafts 48 to support the top cover 2 and, thereby, provide frictional contact between the drum retaining ledges 50, 51 and the shafts 48.

In this manner, the drum/shafts may be retained in a manually selected rotational position at a desired sector-/indicia.

With reference to FIGS. 4, 5 and 6, an alternative construction of the drums is shown. The drum assembly shown in these drawings is similar to that shown in FIGS. 1 and 7 with the exception that a cartridge or cylinder is provided for being removably mounted onto or for forming a sheathing over a cooperating receptacle drum or roller. The color (coded) surface of the cylinder is provided with indicia, for example, as shown in FIGS. 6a or 6b, spaced circumferencially around its surface. By means of this drum construction, additional or replacement cartridges containing varied and/or progressional indicia formed on their surfaces can be provided along with replacement and corresponding tactile figures. In this manner, the child's interest may be increased or maintained by the provision of replacement cartridges/drums containing different symbols or indicia. For example, the bands or drums having the indicia 1 through 5 may be replaced by bands/drums having the indicia, for example, 5 through 9 on their surface. Thus, after learning the associative significance between the first set of indicia, i.e., between the words one, two . . . five and the numbers 1, 2 . . . 5 and the progressional significance/interrelationship between these indicia, the learning experience can be extended by substituting drums containing the sector indicia, for example, 5 through 9 and five through nine which are color (coded) for suggesting association/alignment with the rows 7 through 11 respectively. In this manner, progressional memory and/or extended learning can be effected by the provision of substitution bands/drums.

OPERATION

If the drums are properly positioned within the housing assembly 1, rotation of the drums within a color (coded) row to that sector of its surface which is correspondingly color (coded) horizontally aligns two symbols, indicia or intelligence having associative/significance. Similar actuation of the drums in a column vertically aligns symbols, indicia or intelligence having progressional and/or sequential significance.

The tactile figures are removably affixed to the housing assembly 1 to permit manipulation thereof and arrangement in a desired order. The tactile figures are color (coded) to imply association/alignment with the correspondingly color (coded) rows and drum sectors.

Thus, in accordance with the invention, the educational/toy device provides a new and improved educational aid and a toy/game which enables learning under a low pressure play situation and, thereby, may develop the feeling that it is fun to learn.

It is to be understood that the above described arrangements are illustrative of the application of the principles of the invention. Other arrangements may be devised by those skilled in the art without departing from the spirit and scope of the invention. For example, the drums may comprise a pentahedron with each plane face or surface forming a sector.

Therefore, the term "indicia" shall mean any pictorial representation, word, number, symbol, item, marking, printed intelligence or the like. The term "drum" as herein used shall mean any object, figure etc. suitable for displaying indicia on its peripheral surface. And the term "associative significance" and "corresponding" shall mean a generally recognized or assigned or desirable interrelationship between the referred to indicia.

What I claim is:
1. An educational/toy device comprising:
a housing having formed therein at least four openings disposed to substantially form at least two adjacent columns of openings each having at least two openings laterally disposed from an opening in an adjacent column to form at least two rows of laterally aligned openings, said rows each being visually distinguishable;
drum mounting means;
at least two adjacent columns of drums, each column having at least two drums each laterally disposed from a drum in an adjacent column and rotatably mounted by said drum mounting means within said housing for separate rotation thereof from the exterior of said housing and being viewable through said openings, each drum in a column having at least one indicia on its peripheral surface corresponding to an indicia on the peripheral surface of a drum in the other column, each said corresponding indicia being integrated with a similar color to enable lateral alignment of similar colors and to thereby enable lateral alignment of the corresponding indicia on the peripheral surfaces of the drums with separate rotation of the drums; and
at least two tactile figures each affixed to said housing to enable lateral alignment of corresponding indicia and tactile figures.

2. An educational and/or toy device comprising:
a housing having formed therein at least four openings disposed to substantially form at least two adjacent columns of openings each having at least two openings with each opening in a column being laterally disposed from an opening in an adjacent column to form at least two rows of laterally aligned openings, said rows each being visually distinguishable with a different color integrated therewith to enable individual identification of said rows;
drum mounting means;
first and second adjacent columns of drums, each column having at least two drums each laterally disposed from a drum in an adjacent column and rotatably mounted by said drum mounting means within said housing for separate rotation thereof from the exterior of said housing and being viewable through said openings, each drum having at least two indicia on its peripheral surface with at least one of said indicia on a first drum in said first column having associative significance with an indicia on the other drum in said first column and having associative significance with an indicia on a laterally disposed drum in said second column, each said indicia having associative significance being integrated with a similar color of a color identifiable row to enable lateral alignment of the indicia having associative significance with alignment of similar colored indicia and row with separate rotation of said drums; and
at least two removably mounted tactile figures each configured to have associative signigicance with an indicia and integrated with a similar color as the associated indicia is integrated with to enable alignment of associated indicia and tactile figures with alignment of similar colors.

3. An educational and/or toy device as in claim 2 wherein:

the drums disposed in a column have indicia integrated with a coding means for aligning the indicia in a predetermined columnar arrangement.

4. An educational and/or toy device as in claim 3 wherein:
the coding means comprises alignment of a color integrated with an indicia with a similar color provided on said housing.

5. An educational and/or toy device as in claim 2 wherein:
the indicia on each drum in said first column comprises a first indicia associated with a first color and a second indicia associated with a second color;
the indicia on each drum in said second column comprises a third indicia associated with said first color and a fourth indicia associated with said second color;
wherein alignment of the laterally disposed drums to said first color aligns the first and third indicia, and alignment of the laterally disposed drums to said second color aligns the second and fourth indicia, and alignment of a first lateral group of drums to said first color and a second lateral group of drums to said second color aligns said first and second indicia in said first column and said third and fourth indicia in said second column to thereby obtain a predetermined columnar arrangement of indicia.

6. An educational device as in claim 5 wherein:
the first indicia is a ONE, the second indicia is a TWO, the third indicia is a 1 and the fourth indicia is a 2.

7. An educational and/or toy device comprising:
a housing having formed therein at least ten viewing openings disposed to form at least two adjacent columns of viewing openings with each column having at least five spaced viewing openings each laterally aligned with a viewing opening in an adjacent column to form at least five rows of laterally aligned viewing openings, said rows each being visually distinguishable with a different color integrated therewith to enable individual identification of said rows;
drum mounting means;
at least five groups of drums, each drum being rotatably mounted by said drum mounting means within said housing for separate rotation from the exterior of said housing and viewable through a viewing opening, each group comprising at least two laterally aligned drums, each drum having at least five indicia spaced about its peripheral surface, each laterally disposed drum within a row having at least one corresponding indicia, each said corresponding indicia being integrated with a similar color of a color identifiable row to enable lateral alignment of corresponding indicia and similar colors within each row identifiable by the similar color and to thereby enable columnar alignment of indicia in a predetermined order; and
at least five tactile figures each configured to correspond with an indicia and integrated with a similar color as the corresponding indicia is integrated with to enable alignment of corresponding indicia and tactile figures with alignment of similar colors.

8. An educational toy device comprising:
a box-like housing having a top cover and a base member, said base member having a bottom wall, a front wall, a back wall, a first and a second outer side drum mounting wall, a first and second inner drum mounting wall each aligned with an outer side drum mounting wall, each drum mounting wall having five spaced drum mounting slot means each aligned with a drum mounting slot means in each drum mounting wall and a drum abutment wall means disposed between the first and second inner drum mounting walls, said top cover having formed therein ten viewing openings disposed to form two adjacent columns of viewing openings with each column having five spaced viewing openings each aligned with a viewing opening in an adjacent column to form five rows of viewing openings with two viewing openings in a row, said rows each being visually distinguishable by a color being associated therewith and wall means adapted for being fitted over said base member;
a first and second set of drum means, each drum means having characteristics for distinguishing said first and second set of drum means, each drum means being rotatably and removably mounted within a drum mounting slot means of said first inner and first outer or said second inner and second outer drum mounting walls for separate rotation from the exterior of said housing and for being viewable through a viewing opening, said drum means and drum mounting slot means being adapted to coact with said drum abutment wall means for aligning and mating the drum means of each set with a predetermined column of viewing openings to enable viewing of each drum means of a set through a viewing opening in said predetermined column of viewing openings with said top cover being fitted over said base member and with each drum means in the first set being laterally aligned with a drum means in the second set, each set comprises five drum means with each drum means having five indicia spaced about its peripheral surface, each laterally aligned drum means having a corresponding indicia associated with a similar color, each said corresponding indicia being associated with a similar colored row to enable lateral alignment of corresponding indicia with alignment of each similar color associated indicia within each similar color associated row to thereby align the indicia on the drum means in said first and second sets in a predetermined columnar order for viewing through said viewing openings; and
five tactile figure means each removably mounted to said top cover and adapted to have physical characteristics corresponding with an indicia and associated with a similar color as the corresponding indicia is associated with to enable aligning placement of the corresponding indicia and tactile figure means with alignment of the indicia and tactile figures associated with a similar color.

9. An educational toy device as in claim 8 wherein:
the five indicia on each drum means in said first set comprises a ONE on an orange colored sector, a TWO on a yellow colored sector, a THREE on a green colored sector, a FOUR on a blue colored sector and a FIVE on a purple colored sector;
the five indicia on each drum means in said second set comprises a 1 on a orange colored sector, a 2 on a yellow colored sector, a 3 on a green colored sector, a 4 on a blue colored sector, and a 5 on a purple colored sector;
each row is colored a color in the predetermined order orange, yellow, green, blue and purple;

the tactile figures comprise a circular object colored orange and having a single dot marking provided thereon, an ellipsoidal object colored yellow and having two dot markings provided thereon, a triangular object colored green and having three dot markings provided thereon, a square object colored blue and having four dot markings provided thereon, and a star colored purple and having five dot markings provided thereon;

the viewing openings in said first column having a first perimeter;

the characteristics of the drum means in said first set comprises a second perimeter and shape adapted for mating with said viewing openings in said first column;

the viewing openings in said second column having a third perimeter less than said first perimeter;

the drum means in said first set having a fourth perimeter and shape adapted for mating with said viewing opening in said second column;

wherein manual rotation of the drum means for viewing of selected colored sectors through the viewing openings for alignment of the orange colored sectors of the drum means associated with the orange colored row aligns the 1 and ONE indicia, alignment of the yellow colored sectors of the drum means associated with the yellow colored row aligns the 2 and TWO indicia, alignment of the green colored sectors of the drum means associated with the green colored row aligns the 3 and THREE indicia, alignment of the blue colored sectors of the drum means associated with the blue colored row aligns the 4 and FOUR indicia, and alignment of the purple colored sectors of the drum means associated with the purple colored row aligns the 5 and FIVE indicia and aligns the first set of drum means for viewing the indicia in a first columnar order ONE, TWO, THREE FOUR and FIVE and aligns the second set of drum means for viewing the indicia in a second columnar order 1, 2, 3, 4 and 5.

10. An educational toy device as in claim 8 wherein:
the wall means of said top cover has a drum retaining ledge for supportably mounting said top cover onto said drum means and for providing frictional engagement therebetween for maintaining said drum means at a manually selected indicia position for viewing through a viewing window.

* * * * *